United States Patent
Kasbar

(10) Patent No.: US 11,315,435 B2
(45) Date of Patent: Apr. 26, 2022

(54) VERBAL EXPRESSION SYSTEM

(71) Applicant: Gemiini Educational Systems, Inc., Spokane, WA (US)

(72) Inventor: Laura Marie Kasbar, Newport Beach, CA (US)

(73) Assignee: Gemiini Educational Systems, Inc., Spokane, WA (US)

( * ) Notice: Subject to any disclaimer, the term of this patent is extended or adjusted under 35 U.S.C. 154(b) by 8 days.

(21) Appl. No.: 16/786,783

(22) Filed: Feb. 10, 2020

(65) Prior Publication Data

US 2020/0258409 A1 Aug. 13, 2020

Related U.S. Application Data

(60) Provisional application No. 62/888,852, filed on Aug. 19, 2019, provisional application No. 62/803,965, filed on Feb. 11, 2019.

(51) Int. Cl.
| | |
|---|---|
| *G09B 5/04* | (2006.01) |
| *G06F 3/0482* | (2013.01) |
| *G06K 9/00* | (2006.01) |
| *G09B 5/06* | (2006.01) |
| *G10L 15/187* | (2013.01) |
| *G06F 3/0484* | (2013.01) |
| *G06F 3/04842* | (2022.01) |

(52) U.S. Cl.
CPC ............ *G09B 5/04* (2013.01); *G06F 3/0482* (2013.01); *G06F 3/04842* (2013.01); *G06K 9/00335* (2013.01); *G09B 5/065* (2013.01); *G10L 15/187* (2013.01)

(58) Field of Classification Search
CPC ............ G06F 3/0482; G06F 3/04842; G06K 9/00335; G09B 5/04; G09B 5/065; G10L 15/187

See application file for complete search history.

(56) References Cited

U.S. PATENT DOCUMENTS

| | | | |
|---|---|---|---|
| 2003/0028378 A1* | 2/2003 | August | G09B 19/06 704/260 |
| 2005/0048449 A1* | 3/2005 | Marmorstein | G09B 7/00 434/157 |
| 2005/0255430 A1* | 11/2005 | Kalinowski | G09B 19/06 434/169 |
| 2007/0255570 A1* | 11/2007 | Annaz | G09B 19/06 704/270 |

(Continued)

OTHER PUBLICATIONS

International Search Report and Written Opinion for International Application No. PCT/US2020/017498, Notification dated May 12, 2020.

*Primary Examiner* — Sang H Kim

(74) *Attorney, Agent, or Firm* — Knobbe Martens Olson & Bear LLP

(57) ABSTRACT

Systems and methods for verbal expression are provided. In one aspect, a verbal expression system may receive a selection of sound identifiers, generate a list of video files associated with the identifiers, receive a selection of one or more video files, concatenate the video files into an assignment file, and map the assignment file to one or more users. Optionally, the verbal expression system determine user statistics for each user, generates a progress report for each user, and/or transmits the progress report to one or more users.

20 Claims, 7 Drawing Sheets

(56) References Cited

U.S. PATENT DOCUMENTS

| | | | |
|---|---|---|---|
| 2010/0228540 A1* | 9/2010 | Bennett | G09B 5/04 |
| | | | 704/9 |
| 2013/0006625 A1* | 1/2013 | Gunatilake | G10L 17/08 |
| | | | 704/235 |
| 2013/0130212 A1* | 5/2013 | Dohring | G09B 19/06 |
| | | | 434/157 |
| 2013/0195422 A1 | 8/2013 | Patil et al. | |
| 2014/0164507 A1* | 6/2014 | Tesch | H04L 51/10 |
| | | | 709/204 |
| 2014/0289290 A1 | 9/2014 | Von Elgg et al. | |
| 2016/0267179 A1* | 9/2016 | Mei | G06F 16/7834 |

* cited by examiner

VERBAL EXPRESSION SYSTEM

CROSS-REFERENCE TO RELATED APPLICATIONS

This application claims priority under 35 U.S.C. § 119(e) to U.S. Provisional Application No. 62/803,965, entitled "VERBAL EXPRESSION SYSTEM" and filed on Feb. 11, 2019, and to U.S. Provisional Application No. 62/888,852, entitled "VERBAL EXPRESSION SYSTEM" and filed on Aug. 19, 2019, which are hereby incorporated by reference herein in their entireties.

BACKGROUND

Speech-language pathologists help individuals with a variety of communication disorders. For example, a speech-language pathologist can help an individual learn how to pronounce or articulate various sounds and/or how to put sounds together to form words or phrases. Languages, such as the English language, include numerous sounds (e.g., consonants, vowels, vocalic sounds, consonant blends, phonemes, etc.) that can be combined to form a word or phrase. The placement of a sound within a word or phrase can affect how the sound is to be articulated to meet the expected normal pronunciation, and individuals with communication disorders may have trouble articulating certain sounds in certain placements. Thus, a speech-language pathologist may be interested in identifying a subset of all possible sounds and sounds placements in order to treat an individual with a communication disorder.

SUMMARY

One aspect of the disclosure provides a system comprising a non-transitory computer-readable storage medium storing computer-executable instructions. The system further comprises one or more hardware processors in communication with the computer-readable memory, where the executable instructions, when executed by the one or more hardware processors, cause the one or more hardware processors to at least: generate user interface data that, when executed by a user device, causes the user device to display a user interface comprising a plurality of selectable sound identifiers, where an individual sound identifier in the plurality identifies a sound; process an indication that a first sound identifier in the plurality of sound identifiers is selected; determine a set of video files that are each associated with the first sound identifier, where each video file in the set illustrates at least how the first sound is pronounced; update the user interface data to form updated user interface data, where the updated user interface data, when executed by the user device, causes the user device to update the user interface to display the set of video files; process a second indication that a second sound identifier in the plurality of sound identifiers is selected; determine a subset of the set of video files that are each associated with the first sound identifier and the second sound identifier, where each video file in the subset illustrates at least how the first and second sounds are pronounced; and update the updated user interface data to form second updated user interface data, where the second updated user interface data, when executed by the user device, causes the user device to update the user interface to display the subset of the set of video files in place of the set of video files.

The system of the preceding paragraph can include any sub-combination of the following features: where the executable instructions, when executed, further cause the one or more hardware processors to at least: process a third indication that a first video file and a second video file from the subset of the set of video files are selected, merge the first and second video files to form an assignment video file, where the assignment video file is associated with one or more users, and store the video assignment file for subsequent access by the one or more users; where the first video file is selected prior to the second video file, and where the executable instructions, when executed, further cause the one or more hardware processors to at least concatenate the second video file to the end of the first video file to form the assignment video file; where the executable instructions, when executed, further cause the one or more hardware processors to at least: process a third indication that a first video file and a second video file from the subset of the set of video files are selected, assign the first and second video files to a first user, and stream the first and second video files to a second user device associated with the first user; where the first sound comprises one of a consonant, a vowel, a consonant blend, a vocalic sound, or a phoneme; where the executable instructions, when executed, further cause the one or more hardware processors to at least: process a third indication that a clip type is selected, and update the second updated user interface data to form third updated user interface data, where the third updated user interface data, when executed by the user device, causes the user device to update the user interface to display a second subset of the set of video files in place of the subset of the set of video files, where each video file in the second subset is associated with the clip type and illustrates at least how the first and second sounds are pronounced in a word or phrase corresponding to the clip type; where the clip type comprises at least one of an isolated sound, a word, a phrase, a sentence, or a tongue twister; where the first sound identifier is selected in association with a sound placement; where the sound placement comprises one of an initial placement, a medial placement, or a final placement; where each video file in the set of video files illustrates at least how the first sound is pronounced when positioned at the sound placement in a word or phrase; where the second sound identifier is selected in association with a second sound placement; where each video file in the subset of the set of video files illustrates at least how the first sound is pronounced when positioned at the sound placement in a word or phrase and how the second sound is pronounced when positioned at the second sound placement in the word or phrase; where the executable instructions, when executed, further cause the one or more hardware processors to at least: process a third indication that a phoneme structure is selected, and update the second updated user interface data to form third updated user interface data, where the third updated user interface data, when executed by the user device, causes the user device to update the user interface to display a second subset of the set of video files in place of the subset of the set of video files, where each video file in the second subset is associated with the phoneme structure and illustrates at least how the first and second sounds are pronounced in a word or phrase corresponding to the phoneme structure; where the phoneme structure comprises an ordered placement of consonant and vowel sounds; where the first video file comprises a transparent overlay showing at least one of movement of an inner facial bone structure of a speaker, movement and placement of a tongue of the speaker, or teeth of the speaker; and where the set of video files is ordered alphabetically according to a title field associated with each video file in the set.

Another aspect of the disclosure provides a computer-implemented method comprising: generating user interface data that, when executed by a user device, causes the user device to display a user interface comprising a plurality of selectable sound identifiers, where an individual sound identifier in the plurality identifies a sound; processing an indication that a first sound identifier in the plurality of sound identifiers is selected; determining a set of video files that are each associated with the first sound identifier, where each video file in the set illustrates at least how the first sound is pronounced; updating the user interface data to form updated user interface data, where the updated user interface data, when executed by the user device, causes the user device to update the user interface to display the set of video files; processing a second indication that a second sound identifier in the plurality of sound identifiers is selected; determining a subset of the set of video files that are each associated with the first sound identifier and the second sound identifier, where each video file in the subset illustrates at least how the first and second sounds are pronounced; and updating the updated user interface data to form second updated user interface data, where the second updated user interface data, when executed by the user device, causes the user device to update the user interface to display the subset of the set of video files in place of the set of video files, where the computer-implemented method is performed using one or more processors.

The computer-implemented method of the preceding paragraph can include any sub-combination of the following features: where the computer-implemented method further comprises processing a third indication that a first video file and a second video file from the subset of the set of video files are selected, merging the first and second video files to form an assignment video file, where the assignment video file is associated with one or more users, and storing the video assignment file for subsequent access by the one or more users; and where the first video file is selected prior to the second video file, and where merging the first and second video files further comprises concatenating the second video file to the end of the first video file to form the assignment video file.

Another aspect of the disclosure provides non-transitory, computer-readable storage media comprising computer-executable instructions, where the computer-executable instructions, when executed by a computer system, cause the computer system to: generate user interface data that, when executed by a user device, causes the user device to display a user interface comprising a plurality of selectable sound identifiers, where an individual sound identifier in the plurality identifies a sound; process an indication that a first sound identifier in the plurality of sound identifiers is selected; determine a set of video files that are each associated with the first sound identifier, where each video file in the set illustrates at least how the first sound is pronounced; update the user interface data to form updated user interface data, where the updated user interface data, when executed by the user device, causes the user device to update the user interface to display the set of video files; process a second indication that a second sound identifier in the plurality of sound identifiers is selected; determine a subset of the set of video files that are each associated with the first sound identifier and the second sound identifier, where each video file in the subset illustrates at least how the first and second sounds are pronounced; and update the updated user interface data to form second updated user interface data, where the second updated user interface data, when executed by the user device, causes the user device to update the user interface to display the subset of the set of video files in place of the set of video files.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
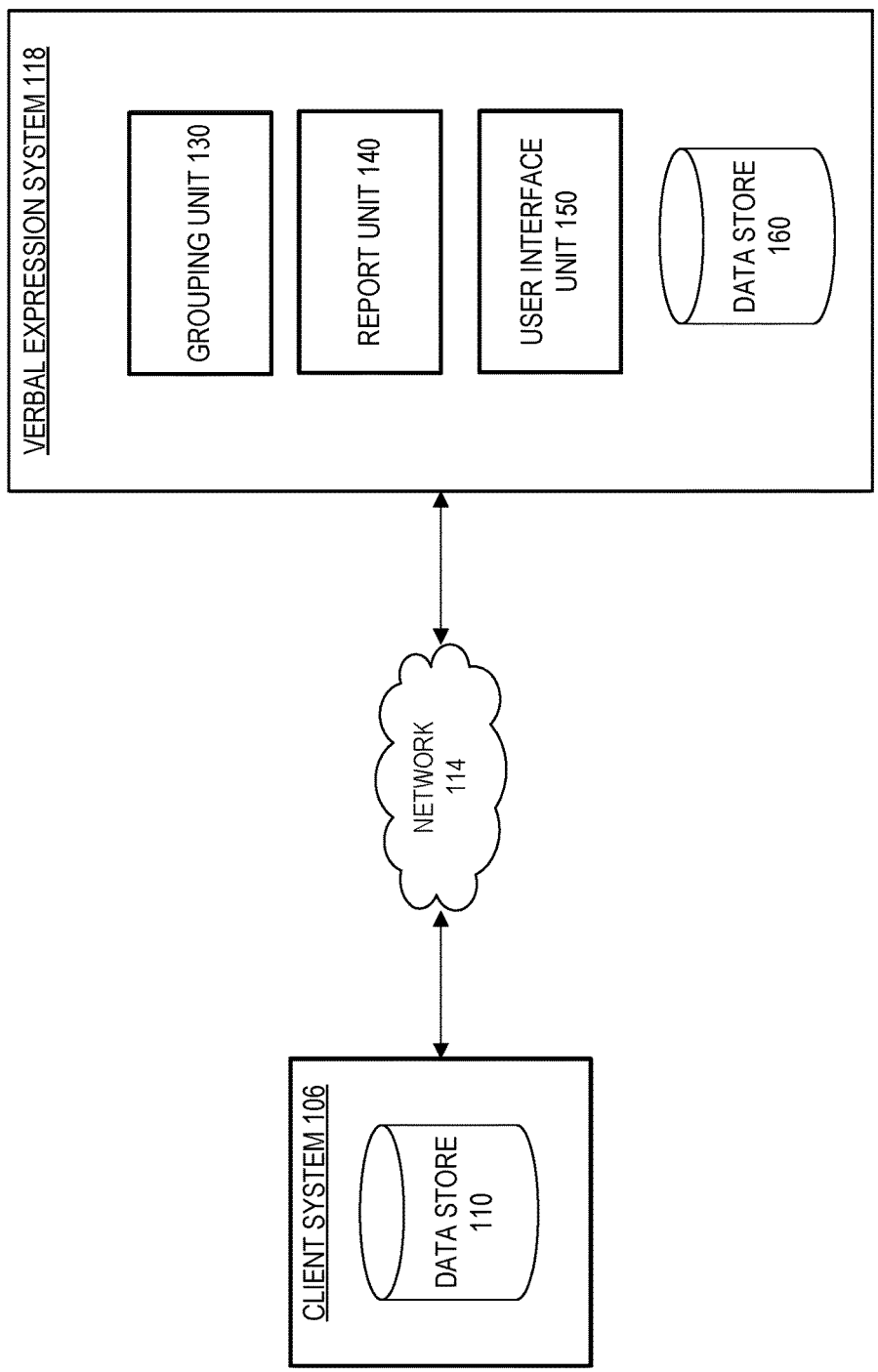
FIG. 1 is a block diagram illustrating an example computing environment for a verbal expression system, according to some embodiments.

As described above, a speech-language pathologist may be interested in identifying a subset of all possible sounds and sound placements in order to treat an individual with a communication disorder. For years, speech-language pathologists have used books and flash cards to treat individuals. For example, a book may include a list of words indexed by the placement of a sound in the word (e.g., an initial, medial, or final placement). In particular, one section of the book may include a first list of words that have a first sound in an initial placement, a second list of words that have the first sound in a medial placement, a third list of words that have the first sound in a final placement, a fourth list of words that have a second sound in an initial placement, and so on. Thus, a speech-language pathologist may browse to a section of a book corresponding to a particular sound and sound placement to identify words or phrases that have the sound and sound placement.

Typically, however, a speech-language pathologist is interested in identifying words or phrases that include multiple sounds in specific placements. Because the books described above are indexed using a single sound and sound placement, the books provide no mechanism for a speech-language pathologist to practically identify words or phrases that include multiple sounds in specific placements. The field of speech pathology can trace its origins to the early years of the 20th century, yet no individual has been able to design a book or electronic system that would allow a speech-language pathologist to identify quickly words or phrases that include multiple sounds in specific placements. The inability for this problem to be solved over the last century is due in part to the fact that the number of possible combinations of sounds and sound placements is nearly infinite.

In fact, it would still be impractical for a speech-language pathologist to use these books to identify words or phrases that include multiple sounds in specific placements even if such books are converted into electronic form and searchable via network pages (e.g., content pages, web pages, etc.) served by a network-accessible system. For example, the network pages may be organized in a hierarchical structure that mirrors the hierarchical structure of the above-described books. A speech-language pathologist may be able to navigate to a particular network page that depicts a list of words that have a particular sound in a particular placement, but the speech-language pathologist would then have to scroll within the network page to try to identify which of these words has a second desired sound in a second desired placement. Given the nearly infinite number of possible combinations of sounds and sound placements, the navigation, scrolling, and/or other user interactions with the network pages that would have to be performed to identify a desired subset of words or phrases would be extremely time-intensive.

Furthermore, even if a speech-language pathologist can identify specific words or phrases that include multiple sounds in specific placements, the speech-language pathologist may still have difficulty treating an individual with a communication disorder. For example, the correct pronunciation of a sound requires a specific placement and/or movement of the tongue and/or facial bone structure. A speech-language pathologist can correctly pronounce a sound in front of an individual with a communication disorder, but the individual has no way of observing where the tongue and/or facial bone structure of the speech-language pathologist are placed and/or how the tongue and/or facial bone structure move when the speech-language pathologist correctly pronounces a sound given that the skin, lips, teeth, etc. of the speech-language pathologist can mask this information.

Accordingly, described herein is a verbal expression system that allows speech-language pathologists and/or any other user to identify quickly words or phrases that include multiple sounds in specific placements. The verbal expression system implements operations that previously could not be performed manually or using a computing system at least for the reasons described above. In addition, the verbal expression system provides a mechanism for individuals with a communication disorder to not only hear the correct pronunciation of a sound or group of sounds, but also to observe where the tongue and/or facial bone structure should be placed and/or how the tongue and/or facial bone structure should move to produce the correct pronunciation.

FIG. 1 is a block diagram illustrating an example computing environment for a verbal expression system 118. The illustrative environment includes a client system 106, a network 114, and the verbal expression system 118. In some embodiments, client system 106 may be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and/or the like. While FIG. 1 illustrates a single client system 106, this is not meant to be limiting. Any number of client systems 106 may each be used by any number of different users (e.g., speech-language pathologists, instructors, etc.) to access and/or to interact with the verbal expression system 118. In some embodiments, the client system 106 may receive one or more files from the verbal expression system 118 over network 114 and store the received files in data store 110. For example, the client system 106 may receive a custom video file from the verbal expression system 118.

In some embodiments, verbal expression system 118 may include a grouping unit 130, a report unit 140, a user interface unit 150, and a data store 160. The data store 160 may store a plurality of video files, such as video files prepared by a speech-language pathologist or instructor. For example, the data store 160 may be a database, where each database entry is a video file associated with one or more consonants, vowels, consonant blends, vocalic sounds, words, tongue twisters, phrases, sentences, isolated sounds, and/or other types of sounds. Each entry in the database may be associated with metadata identifying a title, a duration, one or more sounds and/or one or more sound placements, one or more categories, an address, description, tag, pointer, and/or numerical value of the corresponding video file. For example, a video file may be associated with the numerical value "5" to indicate that the video file corresponds to an enumerated category.

The verbal expression system 118 may utilize grouping unit 130 to group one or more video files into a logical group. As will be discussed later, the grouping unit 130 may track a user's selection of identifiers and/or categories (e.g., where each category corresponds to a sound (e.g., a consonant, a vowel, a consonant blend, a vocalic sound, a phoneme, etc., regardless of whether the sound is or is not part of a word, phrase, sentence, etc.), isolated sound (e.g., a sound that is not part of a word, phrase, sentence, etc.), word, phrase, sentence, tongue twister, etc.) in a user interface and group video files based at least partly on the user selection. In some embodiments, the grouping unit 130 may automatically group a plurality of videos into a logical group based at least partly on a user profile. For example, a user may be associated with a user profile identifying the user's interest in a specific topic in speech pathology training (e.g., tongue twisters), and the grouping unit 130 may use the user profile to group together videos associated with the characteristics of the user profile. In some embodiments, the grouping unit 130 may receive a user selection of video file categories, identify a set of video files associated with the user's selection of categories, and concatenate each video into a single custom video file.

The user interface unit 150 interfaces with users, such as by generating data for interactive graphical user interfaces (e.g., user interface data). For example, the user interface data, when processed by a client system 106, may cause the client system 106 to render and display a user interface that allows a user to identify sounds, words, phrases, or other categories that include one or more sounds in one or more placements, that allows a user to build a custom grouping of videos, and/or that allows a user to assign the custom grouping of videos to specific individuals or groups of individuals (e.g., individual(s) with a communication disorder). As an illustrative example, the graphical user interface resulting from the user interface data may display a list of video file categories and display an overall list of video files associated with the categories. The user interface unit 150 may also include user interface elements (e.g., buttons, drop down menus, etc.) associated with one or more of the video files in the overall list, where selection of a user interface element associated with a video file causes the user interface to play the video file. Further, user interface unit 150 may also display user interface elements (e.g., buttons, text entry fields, etc.) that allow the user to search for video files and/or to adjust the selection of video file categories, which may then be applied to create new custom video file(s) or a custom list of videos corresponding to the adjusted video file categories.

Optionally, the user interface unit 150 displays other information, such as data associated with a user of the verbal expression system 118. By way of example, after utilizing the verbal expression system 118 to generate a custom speech pathology training regime, a user may wish to view a student's progress in the particular training regime (e.g., where a student may be an individual with a communication disorder). The user interface unit 150 may present a visual representation of the student's progress with a plurality of graphs or metrics. For example, the user interface unit 150 may generate a visual representation identifying some or all of the students and associating each student with a numerical value indicating how many videos each student has viewed to completion. Alternatively or in addition, the user interface unit 150 may display a visual representation illustrating the percentage of students or users who have watched, accessed, and/or completed a particular video or group of videos.

The report unit 140 monitors a student's interaction with the verbal expression system 118 and generates reports based on the student's interaction with the verbal expression system 118. For example, report unit 140 may track the number of times a student has viewed a particular video, the amount of time the student has spent watching the video, total amount of time the student has spent watching videos, percent of videos that the student has watched, and/or some other metric specific to the student. The report unit 140 may compile the metrics into a report to be presented to the student or another party through the user interface unit 150. For example, the report unit 140 may monitor the data of multiple students and generate a histogram tracking the distribution of metrics across multiple students. In some embodiments, the report unit 140 may generate other visual representations of a student's data. For example, the report unit 140 may generate a pie chart visually representing the distribution of time a student has spent watching videos among different speech-pathology topics. The reports generated by report unit 140 may be stored in data store 160. In some embodiments, the reports may be transmitted to client system 106 over network 114.

In some embodiments, the network 114 includes any wired network, wireless network, or combination thereof. For example, the network 114 may be a personal area network, local area network, wide area network, over-the-air broadcast network (e.g., for radio or television), cable network, satellite network, cellular telephone network, or combination thereof. As a further example, the network 114 may be a publicly accessible network of linked networks, possibly operated by various distinct parties, such as the Internet. In some embodiments, the network 110 may be a private or semi-private network, such as a corporate or university intranet. The network 114 may include one or more wireless networks, such as a Global System for Mobile Communications (GSM) network, a Code Division Multiple Access (CDMA) network, a Long Term Evolution (LTE) network, or any other type of wireless network. The network 114 can use protocols and components for communicating via the Internet or any of the other aforementioned types of networks. For example, the protocols used by the network 114 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 2A:
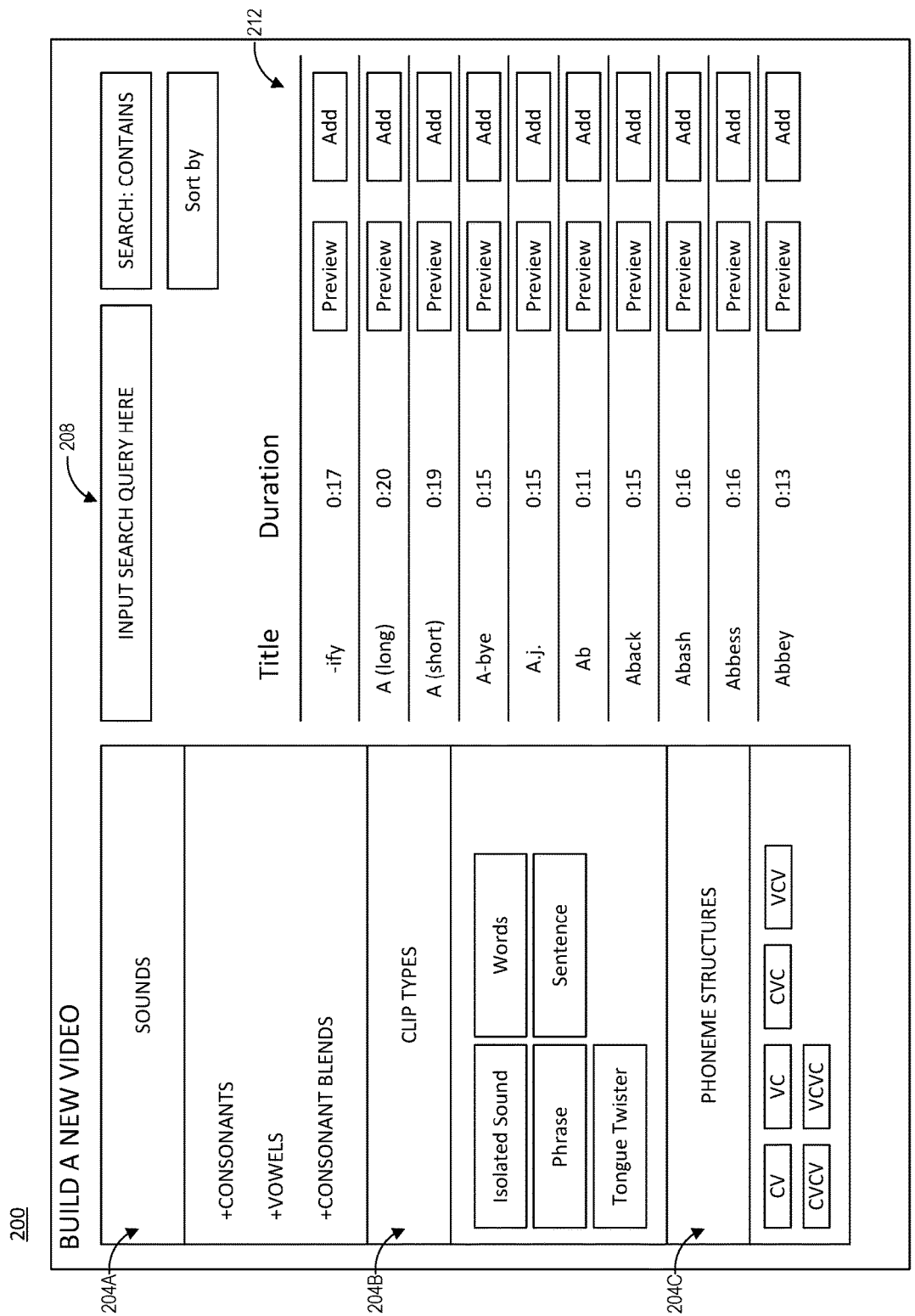
FIGS. 2A-2D illustrate example user interfaces generated by the verbal expression system of FIG. 1.

FIGS. 2A-2D illustrate example user interfaces generated by the verbal expression system 118 (e.g., the user interface unit 150). FIG. 2A illustrates an example user interface 200 that a user (e.g., a speech-language pathologist, instructor, teacher, etc.) may interact with to identify sounds, words, phrases, or other categories that include one or more sounds in one or more placements. The user interface 200 includes headings 204A, 204B, and 204C identifying topics, categories, or identifiers that can be used to generate a custom video file or training regime. In the particular example of FIGS. 2A-2D, the user interface 200 includes headings referring to "SOUNDS," "CLIP TYPES," and "PHONEME STRUCTURES." However, it will be appreciated that in some embodiments, additional or fewer headings may be presented to the user.

In some embodiments, each heading 204A, 204B, and 204C may include subheadings, selections, or options that the user may select to generate a custom video file, to generate a group of custom video files, and/or to populate a list of video files associated with the user selection. For example, selection of a sound under the "SOUNDS" heading may cause the user interface 200 to display sounds, words, phrases, sentences, etc. in pane 212 that include the selected sound and links to corresponding videos that indicate how to pronounce the sound. Similarly, selection of a clip type (e.g., isolated sound, words, phrase, sentence, or tongue twister) under the "CLIP TYPES" heading may cause the user interface 200 to display sounds, words, phrases, sentences, etc. in pane 212 that match the selected clip type with links to corresponding videos that indicate how to pronounce the sounds, words, phrases, sentences, etc. associated with the videos. As an illustrative example, selection of the clip type "tongue twister" may cause the user interface 200 to only display a list of phrases tagged or marked (via metadata) as tongue twisters in pane 212. Selection of the clip type "phrase" may cause the user interface 200 to only display a list of phrases in pane 212. Selection of the clip type "isolated sound" may cause the user interface 200 to only display isolated sounds in pane 212. Likewise, selection of a phoneme structure under the "PHONEME STRUCTURES" heading may cause the user interface 200 to display sounds, words, phrases, sentences, etc. that have sounds that match the selected phoneme structure. As an example, "C" may stand for consonant and "V" may stand for vowel. Selection of the phoneme structure "CVC" may therefore cause the user interface 200 to only display sounds, words, phrases, sentences, etc. that have at least one set of sounds in the sequence consonant-vowel-consonant (e.g., like the word "bad" or the word "bake"). Selection of a phoneme structure does not necessarily mean that the sound, word, phrase, sentence, etc. must start with the first sound in the phoneme structure or that the sound, word, phrase, sentence, etc. must end with the last sound in the phoneme structure. Rather, the sound, word, phrase, sentence, etc. merely includes the sequence of sounds corresponding to the phoneme structure anywhere in the sound, word, phrase, sentence, etc.

In some embodiments, a user may select, simultaneously, one or more clip types, sounds, and/or phoneme structures to search for specific sounds, words, phrases, sentences, etc. For example, a user may be able to select two different types of consonants to search for sounds, words, phrases, sentences, etc. that include both types of consonants. As another example, a user may be allowed to select clip type "Isolated Sound," "Words," "Phrase," "Sentence," and/or "Tongue Twister," and may also be allowed to select one or more sounds. As an illustrative example, a user can select the clip types "Isolated Sound" and "Phrase" and the sounds /b/ and /p/, which causes the verbal expression system 118 to search for isolated sounds and/or phrases that include one and/or both of the sounds /b/ and /p/.

However, in other embodiments, a user selection may be limited to one type of clip type, sound, or phoneme structure. For example, if a user selects "Tongue Twister" under heading 204B, then the user may not be allowed to select another type of clip type under heading 204B. Similarly, if a user selects "Words" under heading 204B, then the user may not be allowed to select another type of clip type under heading 204B. In further embodiments, if a user selects the clip type "Isolated Sound," "Phrase," "Sentence," or "Tongue Twister," then the user may be allowed to select only one sound, and the verbal expression system 118 may only search for an isolated sound, phrase, sentence, or tongue twister that includes the selected sound. On the other hand, if a user selects the clip type "Words," then the user may be allowed to select one or more sounds, and the verbal expression system 118 may search for words that include some or all of the selected sound(s). However, the user may be allowed select a different combination of clip types, sounds, and/or phoneme structures in other searches. For example, the user can select the clip type "Words" and the sound /p/ as part of a first search, and can select the clip type "Sentence" and the sound /b/ as part of a second search. In some embodiments, if the user makes an initial selection of a combination of a sound, clip type, and/or phoneme structure, but then selects a new combination of a sound, clip type, and/or phoneme structure, then the new selection may replace or remove the previous selection. For example, if the user initially selects the clip type "Phrase" and the sound /p/ and then selects the sound /b/, the selection of the sound /b/ may replace the selection of the sound /p/ such that the current selection is of the clip type "Phrase" and the sound /b/.

The user interface 200 may further include a search box 208. The search box 208 may be configured to accept a user input comprising alphanumeric text that the user interface unit 150 can use to search for specific video files corresponding to the user input. For example, a user can enter a sound, word, phrase, title, duration, etc., and the user interface unit 150 can identify specific video files corresponding to the entered sound, word, phrase, title, duration, etc. As described herein, each video file stored in the data store 160 may be associated with metadata that indicates a title of the video file, a duration of the video file, which types of sound(s) are pronounced when the video file is played, the placement(s) of the sound(s) pronounced when the video file is played, etc. As an illustrative example, a first video file may include a person pronouncing the sentence "bees on trees make me flee!" The first video file may therefore be associated with metadata that indicates a title of the first video file is "bees on trees make me flee!," that a duration of the video file (e.g., 34 seconds), that the first video file is associated with tongue twisters (e.g., because the pronounced sentence may be a tongue twister), that the first video file is associated with the vowel sound "ee" in a medial placement (e.g., because the sound "ee" is at a medial placement when pronouncing the words "bees" and "trees"), that the first video file is associated with the vowel sound "ee" in a final placement (e.g., because the sound "ee" is at a final placement when pronouncing the word "flee"), and so on. Thus, once a user enters the user input (e.g., a search query), the user interface unit 150 can use the user input to query the data store 160 for any video files that have metadata indicating that the respective video file has a title, duration, and/or sound matching the user input. If the user enters to sounds as a user input, for example, the user interface unit 150 may query the data store 160 for any video files that have metadata indicating that the respective video file has both sounds. The user interface unit 150 can then retrieve information corresponding to any video files matching the user input (including the video files themselves), and update the user interface data such that information identifying the video files is displayed in the user interface 200.

The user interface 200 may also include a pane 212. In some embodiments, pane 212 is configured to display a list of video files corresponding to the user input entered in search box 208. In some embodiments, pane 212 is configured to display a list of videos based at least partly on a user's selection of options under headings 204A, 204B, and 204C. For example, because no selection or user input has yet been received in FIG. 2A, user interface 200 displays a complete list of all video files stored in data store 160 in pane 212. The video files presented in pane 212 may be ordered or sorted in a number of ways. For example, the presented video files may be ordered or ranked according to alphabetical order of the titles. By way of example, videos associated with titles starting with the letter "a" may be ordered ahead of videos with titles that start with the letter "b." As another example, the video files may be ordered according to the duration of the video itself. By way of example, the pane 212 may display video files in a list such that the first entry in the list is the video with the shortest duration and the last video in the list is the video with the longest duration. As another example, the video files may be ordered according to a selection popularity. By way of example, the pane 212 may display video files in a list such that the first entry in the list is the video that is selected the most often by users and the last video in the list is the video selected least often by users.

Figure 2B:
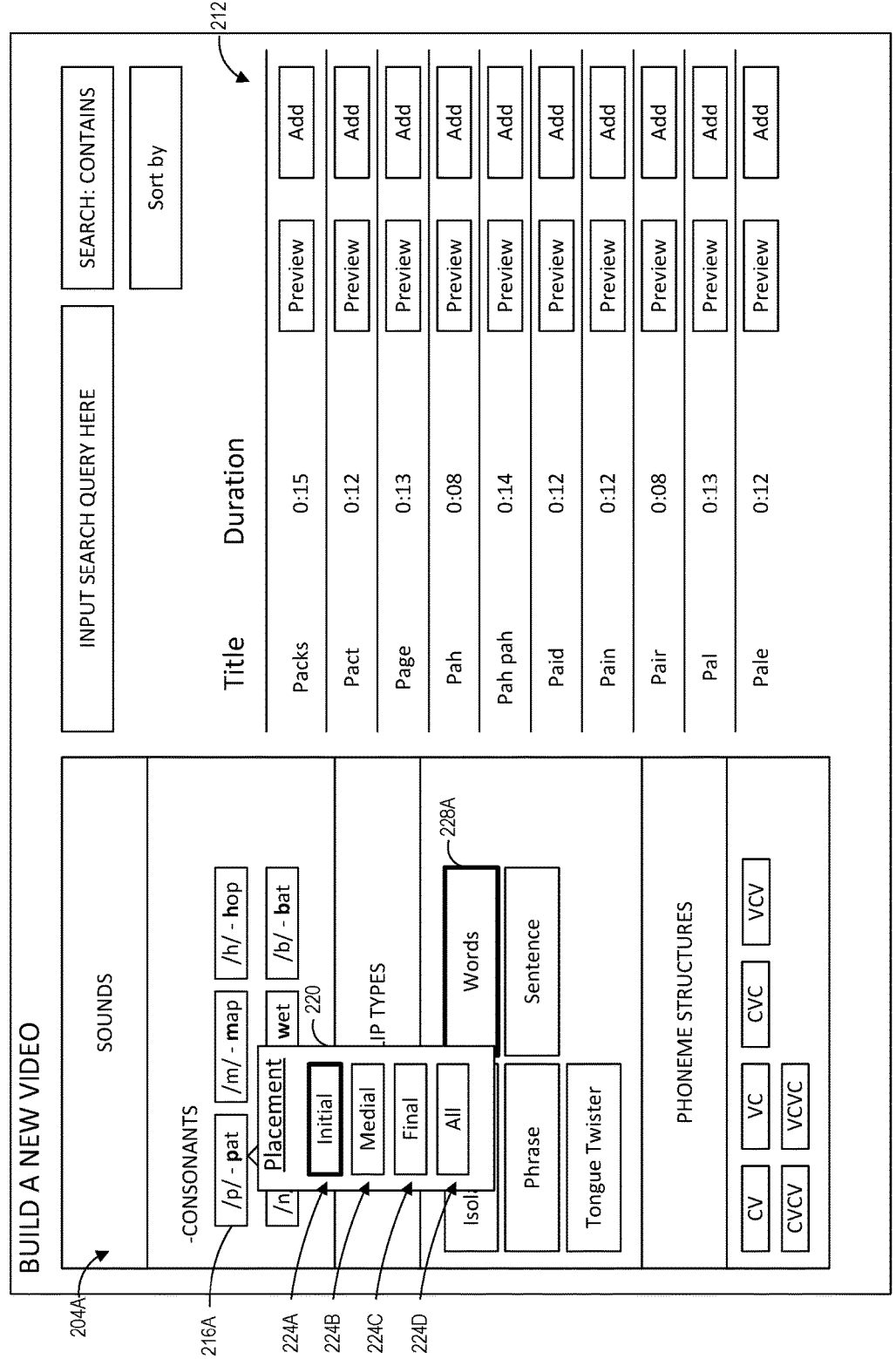
Figure 2C:
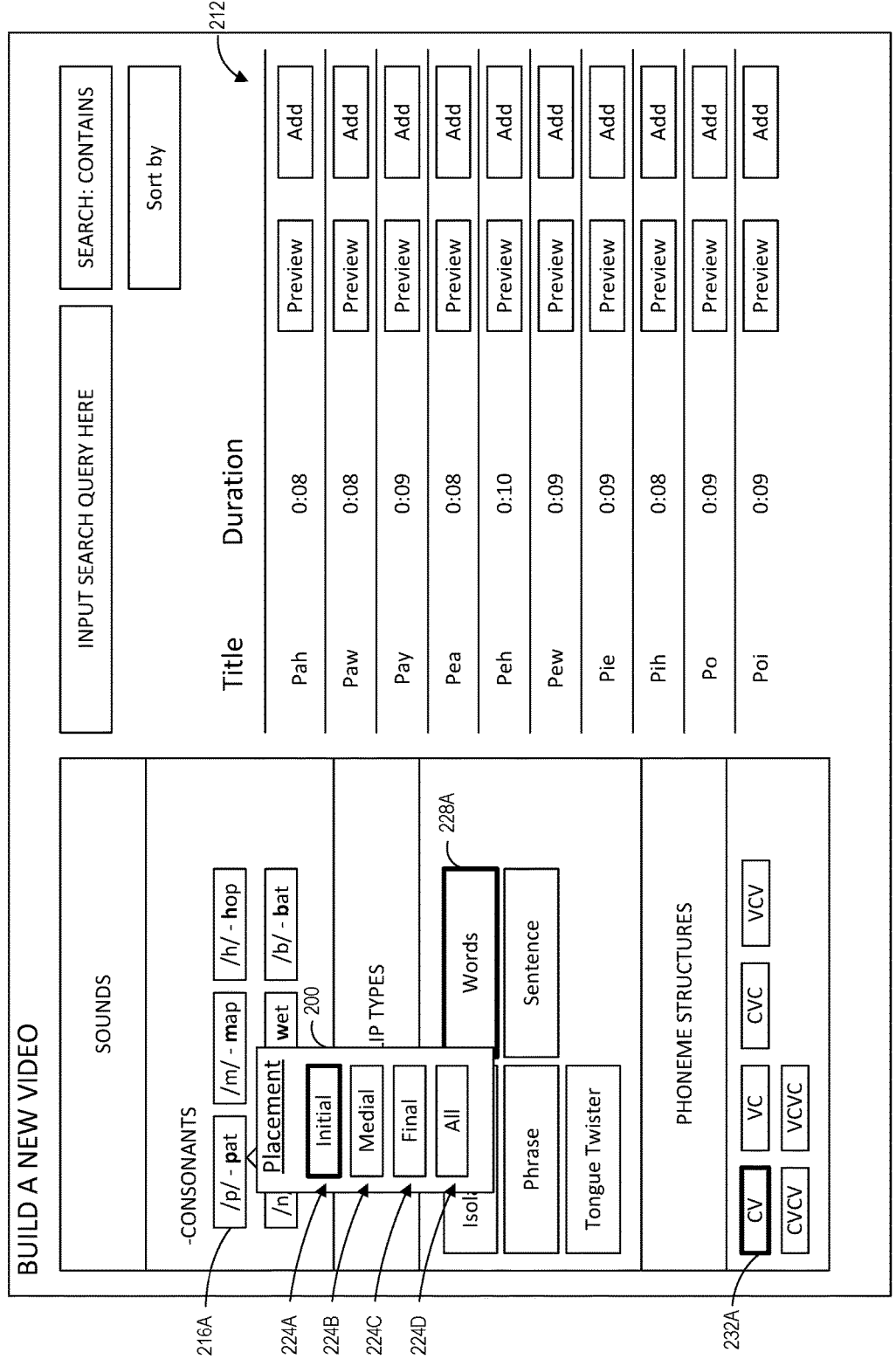

FIG. 2B illustrates the user interface 200 after a user has provided an initial input. In the particular example of FIG. 2B, the user has first clicked on button 216A (which corresponds to the consonant sound /p/ ) underneath heading 204A. A menu 220 is presented to the user in response to the user clicking on button 216A or any other button corresponding to a sound. In some embodiments, menu 220 provides a list of options associated with the selected button 216A. For example, after selecting a particular consonant, vowel, vocalic sound (not shown), and/or consonant blend under heading 204A, the user interface unit 150 may update the user interface data such that menu 220 listing buttons 224A, 224B, 224C, and 224D is displayed. The user may further refine the user input by selecting or clicking on one or more of the buttons 224A, 224B, 224C, and 224D. In some embodiments, buttons 224A, 224B, 224C, and 224D represent options or categories associated with the initial selection of button 216A. For example, selection of button 224A may correspond with a search of some or all videos in data store 160 associated with the consonant /p/ found in an initial placement of a word (e.g., where the user interface unit 150 identifies a video file as being associated with the consonant /p/ found in an initial placement of a word if the metadata associated with the video file indicates that the video file has the consonant /p/ in an initial placement). In some embodiments, selection of button 224B may correspond with a search of some or all videos in data store 160 associated with the consonant /p/ found in a medial placement of a word (e.g., where the user interface unit 150 identifies a video file as being associated with the consonant /p/ found in a medial placement of a word if the metadata associated with the video file indicates that the video file has the consonant /p/ in a medial placement). In some embodiments, selection of button 224C may correspond with a search of some or all videos in data store 160 associated with the consonant /p/ found in a final placement of a word (e.g., where the user interface unit 150 identifies a video file as being associated with the consonant /p/ found in a final placement of a word if the metadata associated with the video file indicates that the video file has the consonant /p/ in a final placement). In some embodiments, selection of button 224D may correspond with a search of some or all videos in data store 160 associated with the consonant /p/ regardless of the position of the consonant within the word (e.g., where the user interface unit 150 identifies a video file as being associated with the consonant /p/ found in any placement or position of a word if the metadata associated with the video file indicates that the video file has the consonant /p/ in an "all" placement and/or if the metadata associated with the video file indicates that the video file has the consonant /p/ in the initial placement, in the medial placement, in the final placement, and/or any combination thereof). The user interface 200 may allow a user to select one or more placements for a selected sound. For example, a user can select button 224A and button 224C for a particular sound, which may cause the verbal expression system 118 to search for sounds, words, phrases, sentences, etc. that include the sound in an initial placement and in a final placement.

In some embodiments, the user interface unit 150 may update the user interface data such that some or all of the buttons 224A-224D of menu 220 are displayed after a user selects a sound, regardless of the clip type that has been selected. For example, the user interface 200 may present a portion of or all of the menu 220 after the user selects a sound if "Isolated Sound," "Words," "Phrase," "Sentence," and/or "Tongue Twister" are selected (or none are selected). It will be appreciated, however, that the selection of sound placements using buttons 224A, 224B, 224C, and 224D may be limited based at least partly on the user selection of a clip type in other embodiments. For example, if the user selects clip type "Isolated Sound," "Phrase," "Sentence," or "Tongue Twister," the user interface unit 150 may not update the user interface data such that some or all of the buttons 224A-224D of menu 220 are displayed when a user selects a sound. Rather, none of the buttons 224A-224D may be displayed, and therefore the user may be unable to select a placement for the selected sound. Instead, the default placement of the selected sound may be the "all" placement (or the initial placement, the medial placement, or the final placement). However, if the user selects the "Words" clip type, the user interface unit 150 may update the user interface data such that some or all of the buttons 224A-224D are displayed when a user selects a sound (e.g., all of the buttons 224A-224D may be displayed, only buttons 224A-224C may be displayed, only button 224B may be displayed, etc.). Thus, the user may be able to select a placement of the selected sound.

The verbal expression system 118 (e.g., the user interface unit 150) may automatically select certain buttons or control options based at least in part on the user's own input. For example, if the user selects button 224A, corresponding to an initial placement of a consonant, the verbal expression system 118 may automatically select button 228A (which, when selected, causes the user interface unit 150 to identify video files corresponding to words only) in conjunction with the user selection of button 224A. Other automatic combinations of selections may be available.

The verbal expression system 118 may also automatically block the user interface 200 from displaying certain content based upon the user input. For example, if the user selected an option for "isolated sound," the user interface unit 150 will not display options for the user to select an initial, medial, or final position of a particular consonant, vowel, or consonant blend (e.g., because the isolated sound is a single sound and therefore there is no specific position or placement). The verbal expression system 118 may populate or generate a list of videos based at least upon the user selection or combination of selections.

In FIG. 2B, pane 212 displays a list of videos associated with the consonant /p/ found in an initial position or placement of a word. Each video presented in pane 212 may be associated with additional user interface control elements or information. For example, each entry in pane 212 is associated with a title, a numerical representation of the duration of the video, and two buttons "Preview" and "Add." As will be discussed later, the user may select the "Preview" button that, when selected, causes the user interface unit 150 to generate updated user interface display causing the display of a window that allows a user to play the video file. By selecting the "Add" button, the user may mark the particular video to be included in a custom assignment list of videos or a custom assignment video file. In some embodiments, the verbal expression system 118 may automatically concatenate each video file in the assignment list together to create a custom assignment video file (e.g., if a client system 106 requests the downloading of a custom video over the network 114 prior to playback). In some embodiments, the assignment list of videos or the custom assignment video file may be assigned or transmitted to specific users or recipients (e.g., to the client system 106). By way of example, a first custom video file may be assigned to Student 1, a second custom video file may be assigned to Student 2, and a third custom video file may be assigned to Student 3. In some embodiments, the recipient may only access video files that the user has assigned or otherwise transmitted to the recipient.

After receiving the user input or selection, the verbal expression system 118 may populate a list of videos associated with the user input in pane 212. In some embodiments, the list of videos presented in pane 212 may change dynamically to reflect the user's selections in real time (e.g., within a few milliseconds or seconds of a user making a selection or adjusting a selection). For example, after the user selects button 232A in FIG. 2C (which is the selection of the phoneme structure "CV" or consonant-vowel), the pane 212 may display a new list of videos that correspond to the user selection of buttons 224A, 228A, and 232A (e.g., the list of videos displayed may be videos that have the consonant /p/ in an initial placement, that correspond to words, and that have the phoneme structure "CV" within the word(s)). In other embodiments, pane 212 may not update in real time and may update only when a user selects a user interface control element (e.g., a user makes a new selection and then selects a "Refresh Search" button).

The list of videos displayed in the pane 212 may be generated based at least partly on metadata (e.g., tags) associated with the video files stored in the data store 160. For example, a user that uploads, generates, or otherwise selects a video file can tag the video file to identify one or more words spoken therein, clip type(s) spoken therein, sound(s) spoken therein, the phoneme structure of the word(s) spoken therein, etc. The verbal expression system 118 (e.g., the grouping unit 130) may search for video files associated with the tags "clip type: word" and "sound: /p/" if the user selects the "Words" clip type and the /p/ consonant sound. In some embodiments, a video file including phrases, sentences, tongue twisters, or other sets of multiple words may be associated with one or more tags that identify each individual word in the video file. For example, a video file in which the phrase "Walk the dog" is spoken may be associated with a first tag for the word "walk," a second tag for the word "the," and a third tag for the word "dog." Alternatively, a video file in which the phrase "Walk the dog" is spoken may be associated with a single tag that identifies the words "walk," "the," and "dog" or multiple tags that each identify one or more of the words "walk," "the," and "dog." In some embodiments, a video file may be associated with a tag that identifies a complete phrase, sentence, or other set of multiple words, and the verbal expression system 118 (e.g., the grouping unit 130) may automatically parse the tag to identify individual words present in the set of multiple words and/or to identify the placements of sounds within the individual words. In further embodiments, a video file may not be associated with any metadata that identifies the word(s) spoken in the video file, but the verbal expression system 118 (e.g., the grouping unit 130) can perform speech recognition on the audio of the video file to identify individual words present in the set of multiple words spoken in the video file and/or to identify the placements of sounds within the individual words.

Figure 2D:
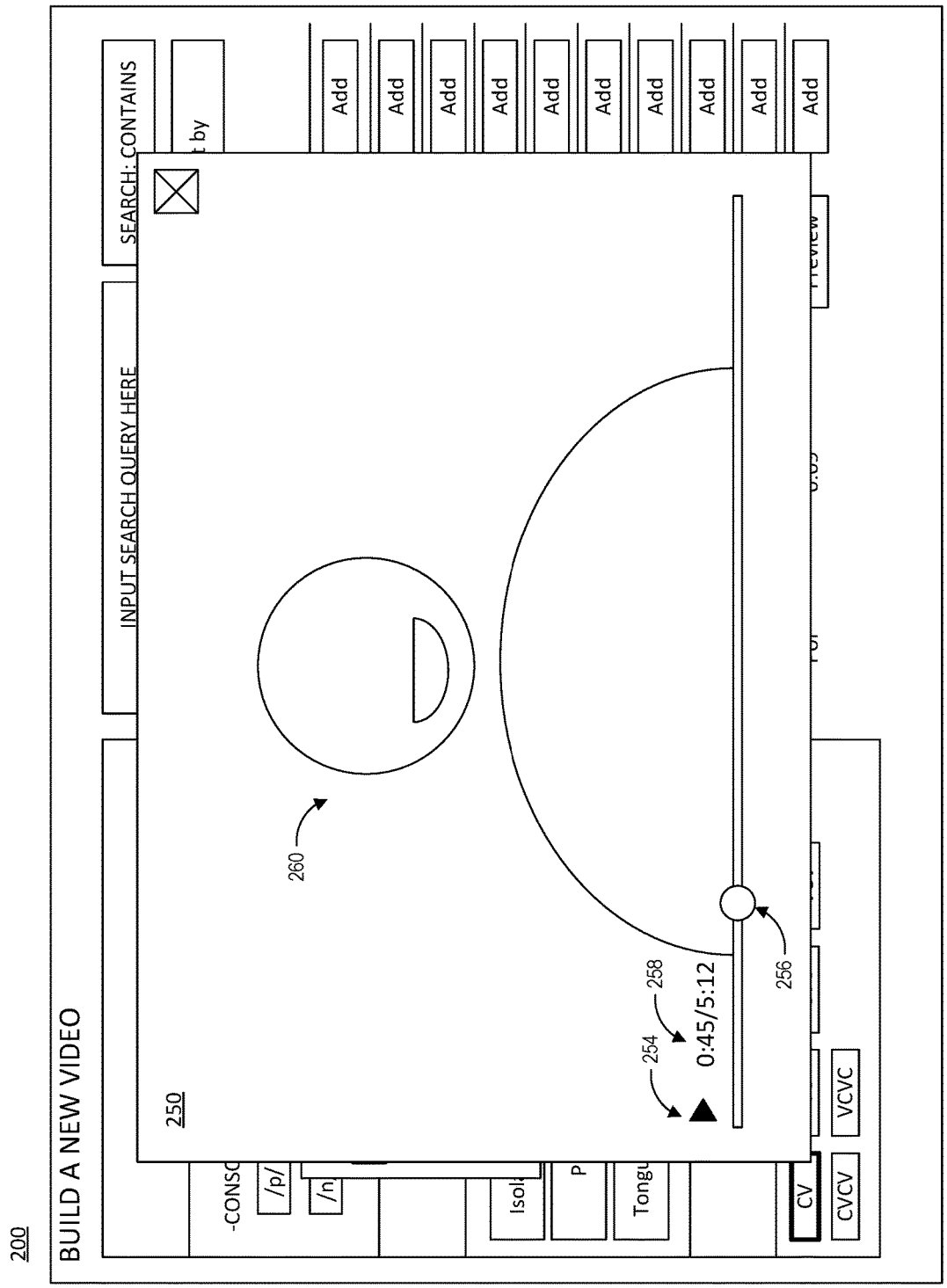

FIG. 2D illustrates an example user interface displaying a video file. In some embodiments, the verbal expression system 118 (e.g., the user interface unit 150) may generate updated user interface data that, when rendered, causes the user interface 200 to display window 250 within the user interface 200. The window 250 may depict a selected video file (e.g., a video file selected via the "preview" button) and allow a user to play, pause, stop, etc. the video file. In some embodiments, the window 250 may display control elements 254 and 256 to allow the user to manipulate or otherwise control the viewing experience of the video. For example, in the example of FIG. 2D, control element 254 is a play button allowing the user to initiate playback of the video file. Control element 256 is a slider allowing the user to view the video from a selected starting point defined by the slider's position. The window 250 may also include a time display 258 displaying the total duration of the video and the time stamp of the user's current location within the video. It will be appreciated that, in other embodiments, window 250 may display a variety of other control options or features (e.g., a pause button, a stop button, a fast forward button, a rewind button, etc.).

In the example of FIG. 2D, window 250 displays an instruction video of a person 260 pronouncing a particular sound, word, phrase, sentence, and/or the like. Advantageously, the instruction video may include the correct pronunciation of a sound, word, phrase, sentence, and/or the like, and show a specific placement and/or movement of the tongue and/or facial bone structure. For example, the instruction video may be a video depicting the person 260 as would be observed by a student if the person 260 and the student were in the same location. However, a transparent overlay may be superimposed upon person 260 within the instruction video showing the inner facial bone structure and/or placement of the tongue and/or teeth that otherwise could not be observed if the person 260 and student were in the same location looking at each other. As an illustrative example, the transparent overlay superimposed upon person 260 in the video depicted in the window 250 may appear to be an X-RAY showing the inner facial bone structure and/or placement of the tongue and/or teeth of the person 260. As the instruction video is played, the inner facial bone structure and/or placement of the tongue and/or teeth of the person 260 superimposed over the person 260 may move to reflect the movement (e.g., facial movement) of the person 260 as the person 260 is pronouncing sound(s). In this way, the video depicted in the window 250 may allow a student to learn how to pronounce the sound(s) in a manner that is not possible if the student and the person 260 were simply present in the same location and looking at each other.

Figure 3:
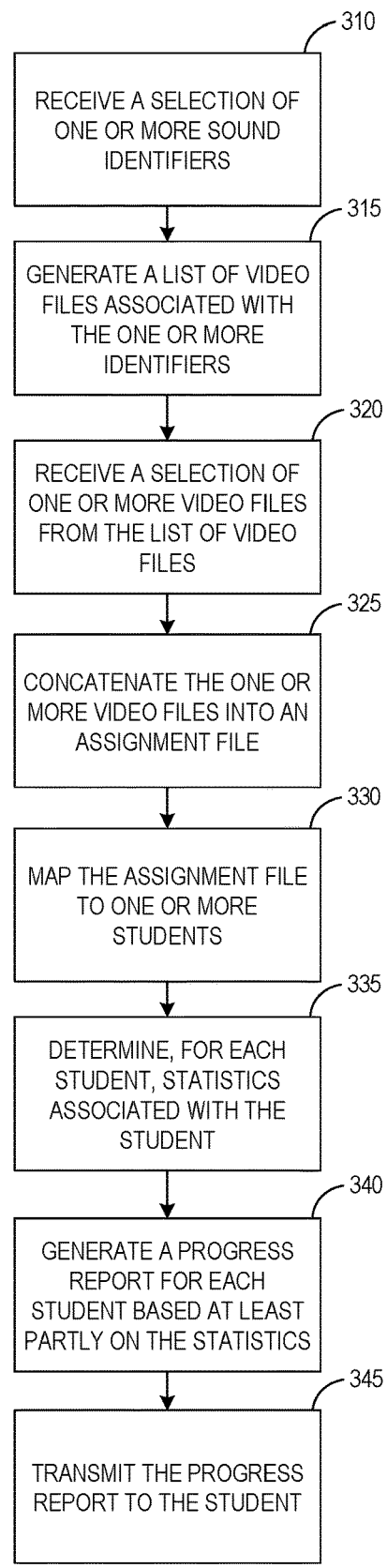
FIG. 3 is a flow diagram of an example verbal expression method, according to some embodiments.

FIG. 3 is a flow diagram of an example verbal expression method. The example verbal expression method may be implemented by the verbal expression system 118.

At block 310, the verbal expression system 118 may receive a selection of one or more sound identifiers. In some embodiments, the selection may comprise a series of mouse clicks on a web page view of the verbal expression system 118 (e.g., a series of selections in user interface 200). The one or more sound identifiers may be associated with a number of common word structures. For example, a first sound identifier may be associated with consonant pronunciations, and a second sound identifier may be associated with vowel pronunciations. In some embodiments, other identifiers may be utilized. For example, the verbal expression system 118 may provide a sound identifier to identify a particular phoneme structure of a word or phrase. In general, a sound identifier can identify a sound (e.g., a consonant, vowel, vocalic sound, consonant blend, phoneme, etc.) and be associated with a pronunciation of the sound.

At block 315, the verbal expression system 118 may generate a list of video files associated with the one or more sound identifiers. In some embodiments, each video file stored in the verbal expression system 118 may be associated with a title, a duration, one or more sounds and/or one or more sound placements, one or more categories, an address, description, tag, pointer, or numerical value. For example, a video file may be associated with the numerical value "5" to indicate that the video file corresponds to an enumerated category. In some embodiments, each video file may be mapped to a particular sound identifier. For example, a video file illustrating the correct pronunciation of the word "pair" may be mapped to a consonant sound identifier that identifies the consonant "p." In some embodiments, each video file may be associated with a combination of sound identifiers. For example, a video corresponding to the word "pair" may be mapped to a consonant sound identifier that identifies the consonant "p" as well as a vowel sound identifier that identifies the vowel "a." The verbal expression system 118, through user interface unit 150, may generate a list of all video files associated with the selected sound identifiers. In some embodiments, the list of video files may be ordered or sorted in a number of ways. For example, the video files may be ordered or ranked according to alphabetical order of the titles. By way of example, videos associated with titles starting with the letter "a" may be ordered ahead of videos with titles that start with the letter "b." In another embodiment, the video files may be ordered according to the duration of the video itself. For example, the first entry in the list of videos may be the video with the shortest duration and the last video in the list may be the video with the longest duration. It will be appreciated that, in other embodiments, other rankings or orderings of video files may be utilized.

The verbal expression system 118 may receive a selection of one or more video files in block 320 (e.g., via the user interface 200 displayed on a client system 106). In some embodiments, the verbal expression system 118 may receive a set of clicks on specific video files (where the clicks occurred via the user interface 200). Selection of a video file may cause the video file to be listed in portion of the user interface 200 identifying selected videos. The order in which the selected video files are listed may be the order in which the video files are selected. The user interface 200 may allow a user to reorder the selected video files. Once the selection of video files has been received, the verbal expression system 118 may concatenate the one or more video files into an assignment file in block 235. The order of concatenation may be the order in which the selected video files are listed. In some embodiments, the verbal expression system 118 may automatically concatenate each selected video file together to create a custom assignment video file. In other embodiments, the verbal expression system 118 may append the end of a first video to the beginning of a second video so that a user may continuously view multiple videos without interruption or pause (e.g., so that the client system 106 can stream the appended videos). For example, the verbal expression system 118 may logically group the selected video files in performing the appending (e.g., the video files are not modified when performing the appending) rather than formally concatenating the video files to form a single video file. The verbal expression system 118 may then transmit fragments of the appended video files in the order in which the video files are appended, such that the client system 106 can stream the appended video files from the verbal expression system 118. The order in which the videos are appended may be the order in which the selected video files are listed. The verbal expression system 118 may append the video files rather than concatenating the video files to preserve computing resources (e.g., since no processing resources would be used to perform concatenation). The verbal expression system 118 may concatenate video files rather than logically grouping or appending the video files if there are network issues (e.g., connectivity issues, reduced bandwidth availability, etc.) between the verbal expression system 118 and the client system 106 and the client system 106 (or the verbal expression system 118) requests that the video files be downloaded locally for playback. In other embodiments, other methods of concatenation may be utilized.

Once the assignment file has been generated in block 325, the verbal expression system 118 may map the assignment file to one or more students in block 330. In some embodiments, a user may manually select or identify a number of recipients or other students who should have access to the assignment file. For example, a speech-language pathologist may generate an assignment file for the purposes of training pronunciation of a specific consonant blend and select specific recipient students via a drop-down menu. Once the assignment file is associated with a student, the student may automatically access the file by accessing the verbal expression system 118 (e.g., via a client system 106 or other computing device). In some embodiments, the assignment file itself may be transmitted to a student remotely over network 114. In other embodiments, the assignment file may simply be stored in a data store (e.g., data store 160) within the verbal expression system 118 to be accessed via a user portal.

At block 335, the verbal expression system 118 optionally determines metrics or statistics for each user as the user progresses through the assigned video or list of videos. For example, the verbal expression system 118, through report unit 140, may monitor the average amount of time students spend completing all videos in the assignment file. In other embodiments, other metrics may be tracked (e.g., how many videos the student has completed).

At block 340, the verbal expression system 118 optionally generates a progress report for each student based at least partly on the determined statistics. For example, the user interface unit 150 may present a visual representation of the student's progress with a plurality of graphs or metrics. For example, the user interface unit 150 may generate a visual representation identifying every student and associating each student with a numerical value indicating how many videos each student has viewed to completion. In another embodiment, the user interface unit 150 may display a visual representation illustrating the percentage of students or users who have watched, accessed, and/or completed a particular video.

At block 345, the verbal expression system 118 optionally transmits the progress report. In some embodiments, a progress report may be transmitted only to the user associated with the progress report. However, in some embodiments, a specific user (e.g., a teacher) may have access to the progress reports of multiple other users (e.g., students). The one or more progress reports may be transmitted over a network to remote client systems or servers.

Figure 4:
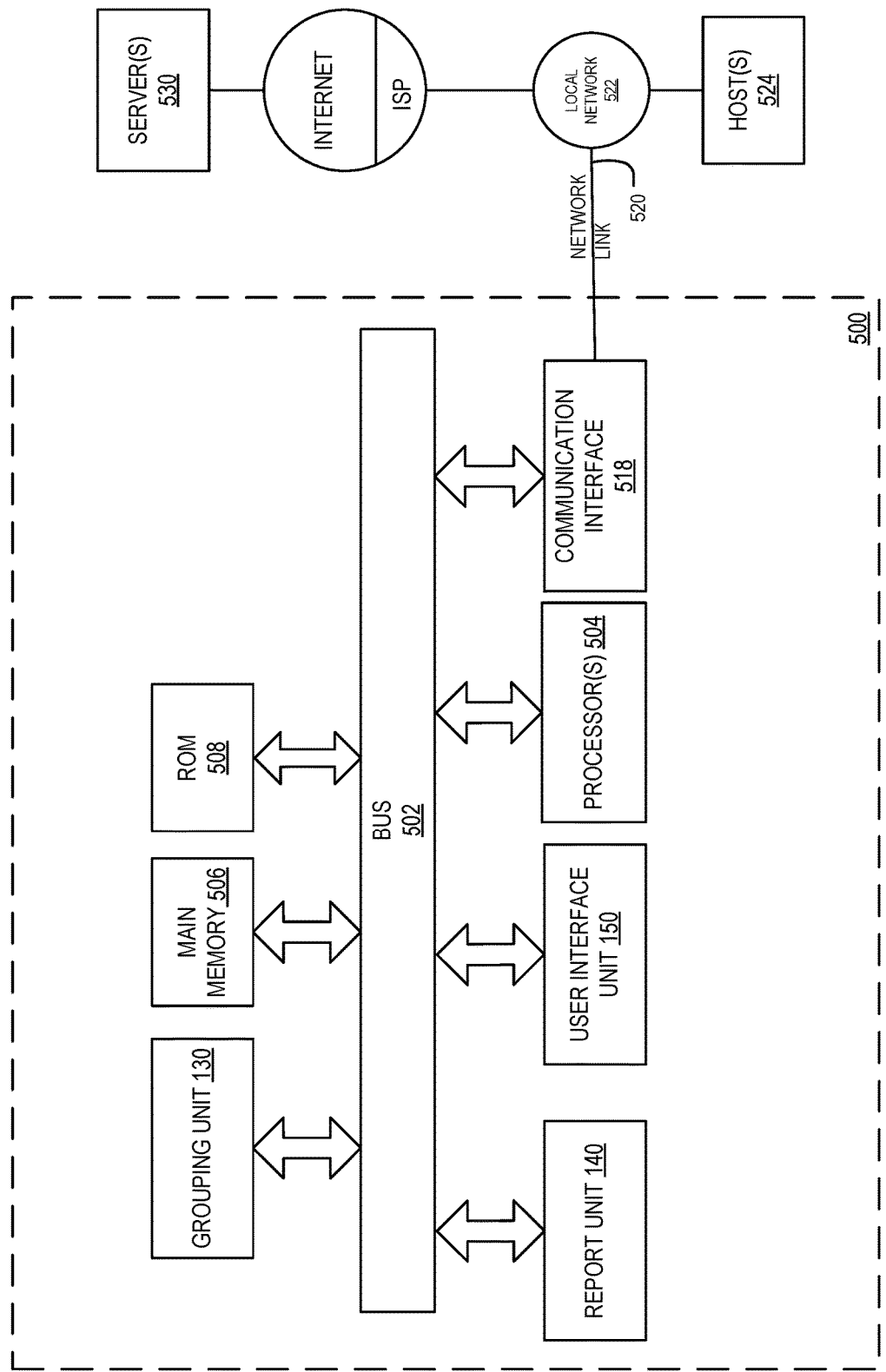
FIG. 4 is a block diagram of an example computing system configured to implement the verbal expression system described herein, according to some embodiments.

FIG. 4 is a block diagram of an illustrative computing system that may implement one or more of the features described. The computing system 500 may be configured to perform all or some of the features of the verbal expression system 118. The computing system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

The computing system 500 also includes a main memory 506, such as a random access memory (RAM), cache, or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render the computing system 500 into a special-purpose machine that is customized to perform the operations specified in the instructions.

The computing system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computing system 500 may further, as described below, implement the techniques described herein using customized hard-wired logic, one or more application specific integrated circuits (ASICs) or field programmable gate arrays (FPGAs), firmware and/or program logic which in combination with the computer system causes or programs the computing system 500 to be a special-purpose machine. According to one embodiment, the techniques herein may be performed by the computing system 500 in response to processor(s) 504 executing one or more sequences of one or more computer readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

As part of a special-purpose machine, the computing system 500 may include vector transform module 532, semantic textual similarity module 534, string matching module 536, and clustering module 538. According to one embodiment, vector transform module 532 may receive as input two strings or sequences and convert them into two vectors through character-level embedding. In some embodiments, semantic textual similarity module 534 and string matching module 536 may respectively generate a low-resolution and high-resolution image to run through separate convolutional neural network models to determine string matching and semantic textual similarity. Convolutional neural network models utilized by modules 534 and 536 may be stored in storage device 510. According to one embodiment, clustering module 538 may transmit instructions through communication interface 518 to one or more servers 530. The instructions transmitted by the clustering module 538 may be stored in storage device 510 in one embodiment.

Various forms of computer readable storage media may be involved in carrying one or more sequences of one or more computer readable program instructions to processor 504 for execution. For example, the instructions may initially be carried on a magnetic disk or solid state drive of a remote computer. The bus 502 may carry data to main memory 506, from which processor 504 retrieves and executes the instructions. The instructions received by main memory 506 may optionally be stored on storage device 510 either before or after execution by processor 504. Additionally, main memory 506 may store a plurality of video files for the verbal expression system.

The computing system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicate with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the Internet 528 to a server 530.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a similarity detection system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A similarity detection system can be or include a microprocessor, but in the alternative, the similarity detection system can be or include a controller, microcontroller, or state machine, combinations of the same, or the like configured to estimate and communicate prediction information. A similarity detection system can include electrical circuitry configured to process computer-executable instructions. Although described herein primarily with respect to digital technology, a similarity detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a similarity detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the similarity detection system such that the similarity detection system can read information from, and write information to, the storage medium. In the alternative, the storage medium can be integral to the similarity detection system. The similarity detection system and the storage medium can reside in an ASIC. The ASIC can reside in a user terminal. In the alternative, the similarity detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a non-transitory computer-readable storage medium storing computer-executable instructions; and
   one or more hardware processors in communication with the non-transitory computer-readable storage medium, wherein the computer-executable instructions, when executed by the one or more hardware processors, cause the one or more hardware processors to at least:
      generate user interface data that, when executed by a user device, causes the user device to display a user interface comprising a plurality of selectable sound identifiers, wherein an individual sound identifier in the plurality identifies a sound;
      process an indication that a first sound identifier in the plurality of sound identifiers is selected;
      determine a set of video files that are each associated with the first sound identifier, wherein each video file in the set illustrates a person demonstrating at least how the first sound is pronounced;
      update the user interface data to form updated user interface data, wherein the updated user interface data, when executed by the user device, causes the user device to update the user interface to display the set of video files;
      process a second indication that a second sound identifier in the plurality of sound identifiers is selected while the first sound identifier is selected in the user interface;
      determine a subset of the set of video files that are each associated with the first sound identifier and the second sound identifier, wherein each video file in the subset illustrates a person demonstrating at least how the first and second sounds are pronounced; and
      update the updated user interface data to form second updated user interface data, wherein the second updated user interface data, when executed by the user device, causes the user device to update the user interface to display the subset of the set of video files in place of the set of video files.

2. The system of claim 1, wherein the computer-executable instructions, when executed, further cause the one or more hardware processors to at least:
   process a third indication that a first video file and a second video file from the subset of the set of video files are selected;
   merge the first and second video files to form an assignment video file, wherein the assignment video file is associated with one or more users; and
   store the video assignment file for subsequent access by the one or more users.

3. The system of claim 2, wherein the first video file is selected prior to the second video file, and wherein the computer-executable instructions, when executed, further cause the one or more hardware processors to at least concatenate the second video file to an end of the first video file to form the assignment video file.

4. The system of claim 1, wherein the computer-executable instructions, when executed, further cause the one or more hardware processors to at least:
   process a third indication that a first video file and a second video file from the subset of the set of video files are selected;
   assign the first and second video files to a first user; and
   stream the first and second video files to a second user device associated with the first user.

5. The system of claim 1, wherein the first sound comprises one of a consonant, a vowel, a consonant blend, a vocalic sound, or a phoneme.

6. The system of claim 1, wherein the computer-executable instructions, when executed, further cause the one or more hardware processors to at least:
   process a third indication that a clip type is selected; and
   update the second updated user interface data to form third updated user interface data, wherein the third updated user interface data, when executed by the user device, causes the user device to update the user interface to display a second subset of the set of video files in place of the subset of the set of video files, wherein each video file in the second subset is associated with the clip type and illustrates the person demonstrating at least how the first and second sounds are pronounced in a word or phrase corresponding to the clip type.

7. The system of claim 6, wherein the clip type comprises at least one of an isolated sound, a word, a phrase, a sentence, or a tongue twister.

8. The system of claim 1, wherein the first sound identifier is selected in association with a sound placement.

9. The system of claim 8, wherein the sound placement comprises one of an initial placement, a medial placement, or a final placement.

10. The system of claim 8, wherein each video file in the set of video files illustrates the person demonstrating at least how the first sound is pronounced when positioned at the sound placement in a word or phrase.

11. The system of claim 10, wherein the second sound identifier is selected in association with a second sound placement.

12. The system of claim 11, wherein each video file in the subset of the set of video files illustrates the person demonstrating at least how the first sound is pronounced when positioned at the sound placement in a word or phrase and how the second sound is pronounced when positioned at the second sound placement in the word or phrase.

13. The system of claim 1, wherein the computer-executable instructions, when executed, further cause the one or more hardware processors to at least:
process a third indication that a phoneme structure is selected; and
update the second updated user interface data to form third updated user interface data, wherein the third updated user interface data, when executed by the user device, causes the user device to update the user interface to display a second subset of the set of video files in place of the subset of the set of video files, wherein each video file in the second subset is associated with the phoneme structure and illustrates the person demonstrating at least how the first and second sounds are pronounced in a word or phrase corresponding to the phoneme structure.

14. The system of claim 13, wherein the phoneme structure comprises an ordered placement of consonant and vowel sounds.

15. The system of claim 1, wherein the first video file comprises a transparent overlay showing at least one of movement of an inner facial bone structure of a speaker, movement and placement of a tongue of the speaker, or teeth of the speaker.

16. The system of claim 1, wherein the set of video files is ordered alphabetically according to a title field associated with each video file in the set.

17. A computer-implemented method comprising:
generating user interface data that, when executed by a user device, causes the user device to display a user interface comprising a plurality of selectable sound identifiers, wherein an individual sound identifier in the plurality identifies a sound;
processing an indication that a first sound identifier in the plurality of sound identifiers is selected;
determining a set of video files that are each associated with the first sound identifier, wherein each video file in the set illustrates a person demonstrating at least how the first sound is pronounced;
updating the user interface data to form updated user interface data, wherein the updated user interface data, when executed by the user device, causes the user device to update the user interface to display the set of video files;
processing a second indication that a second sound identifier in the plurality of sound identifiers is selected while the first sound identifier is selected in the user interface;
determining a subset of the set of video files that are each associated with the first sound identifier and the second sound identifier, wherein each video file in the subset illustrates a person demonstrating at least how the first and second sounds are pronounced; and
updating the updated user interface data to form second updated user interface data, wherein the second updated user interface data, when executed by the user device, causes the user device to update the user interface to display the subset of the set of video files in place of the set of video files,
wherein the computer-implemented method is performed using one or more processors.

18. The computer-implemented method of claim 17, further comprising:
processing a third indication that a first video file and a second video file from the subset of the set of video files are selected;
merging the first and second video files to form an assignment video file, wherein the assignment video file is associated with one or more users; and
storing the video assignment file for subsequent access by the one or more users.

19. The computer-implemented method of claim 18, wherein the first video file is selected prior to the second video file, and wherein merging the first and second video files further comprises concatenating the second video file to an end of the first video file to form the assignment video file.

20. Non-transitory, computer-readable storage media comprising computer-executable instructions, wherein the computer-executable instructions, when executed by a computer system, cause the computer system to:
generate user interface data that, when executed by a user device, causes the user device to display a user interface comprising a plurality of selectable sound identifiers, wherein an individual sound identifier in the plurality identifies a sound;
process an indication that a first sound identifier in the plurality of sound identifiers is selected;
determine a set of video files that are each associated with the first sound identifier, wherein each video file in the set illustrates a person demonstrating at least how the first sound is pronounced;
update the user interface data to form updated user interface data, wherein the updated user interface data, when executed by the user device, causes the user device to update the user interface to display the set of video files;
process a second indication that a second sound identifier in the plurality of sound identifiers is selected while the first sound identifier is selected in the user interface;
determine a subset of the set of video files that are each associated with the first sound identifier and the second sound identifier, wherein each video file in the subset illustrates a person demonstrating at least how the first and second sounds are pronounced; and
update the updated user interface data to form second updated user interface data, wherein the second updated user interface data, when executed by the user device, causes the user device to update the user interface to display the subset of the set of video files in place of the set of video files.

* * * * *